US012597165B2

(12) United States Patent (10) Patent No.: US 12,597,165 B2
Tanaka (45) Date of Patent: Apr. 7, 2026

(54) CALIBRATION METHOD AND MEASUREMENT SYSTEM

(71) Applicant: MITUTOYO CORPORATION, Kanagawa (JP)

(72) Inventor: Ryosuke Tanaka, Oberndorf am Neckar (DE)

(73) Assignee: MITUTOYO CORPORATION, Kanagawa (JP)

( * ) Notice: Subject to any disclaimer, the term of this patent is extended or adjusted under 35 U.S.C. 154(b) by 280 days.

(21) Appl. No.: 18/435,347

(22) Filed: Feb. 7, 2024

(65) Prior Publication Data

US 2024/0282004 A1 Aug. 22, 2024

(30) Foreign Application Priority Data

Feb. 16, 2023 (JP) ................................. 2023-022521

(51) Int. Cl.
*G06T 7/80* (2017.01)
*H04N 23/695* (2023.01)

(52) U.S. Cl.
CPC .............. *G06T 7/80* (2017.01); *H04N 23/695* (2023.01)

(58) Field of Classification Search
CPC ........... G06T 7/80; G06T 7/0004; G06T 7/62; G06T 2207/10012; G06T 2207/30164; G06T 7/70; H04N 23/695; G01B 11/24; A61B 2034/2055; B25J 9/1692
See application file for complete search history.

(56) References Cited

U.S. PATENT DOCUMENTS 8,320,653 B2 * 11/2012 Holsing ................. A61B 90/36
382/131
2007/0122020 A1 * 5/2007 Claus .................... G06T 11/005
382/131
2009/0324009 A1 * 12/2009 Schulz ...................... G06T 7/73
382/103
2017/0264885 A1 9/2017 Haugan et al.

FOREIGN PATENT DOCUMENTS

JP 2019-507885 3/2019

OTHER PUBLICATIONS

Tamaki, "Pose Estimation and Rotation Matrices", The Institute of Electronics, Information and Communication Engineers, 2009, pp. 59-64, along with an English translation thereof.
U.S. Appl. No. 18/435,289, to Yuji Kudo, filed Feb. 7, 2024.

* cited by examiner

*Primary Examiner* — Claire X Wang
(74) *Attorney, Agent, or Firm* — Greenblum & Bernstein, P.L.C.

(57) ABSTRACT

A calibration method including: a first imaging step of imaging a calibration jig, a second imaging step of imaging the calibration jig after causing the calibration jig to be moved in a predetermined first direction, a third imaging step of imaging the calibration jig after causing the calibration jig to be moved in a predetermined second direction, a fourth imaging step of imaging the calibration jig, a fifth imaging step of imaging the calibration jig after rotating the calibration jig about an axis oriented in a predetermined third direction, a sixth imaging step of imaging the calibration jig after rotating the calibration jig about an axis oriented in a predetermined fourth direction, and identifying calibration parameters used for calibration of the measurement apparatus.

12 Claims, 7 Drawing Sheets

DIRECTIONS Tx1 AND Tx2
COINCIDE WITH
DIRECTIONS Ty1 AND Ty2

ROTATE WITH
ROTATION MATRIX R

FIG. 5C

MOVE WITH TRANSLATION VECTOR T

CALIBRATION METHOD AND MEASUREMENT SYSTEM

CROSS-REFERENCE TO RELATED APPLICATIONS

The present application claims priority to Japanese Patent Applications number 2023-022521, filed on Feb. 16, 2023. The contents of this application are incorporated herein by reference in their entirety.

BACKGROUND OF THE INVENTION

A measurement apparatus that includes a plurality of imaging apparatuses and measures a three-dimensional geometry of a measurement target in a non-contact manner on the basis of a result obtained by capturing the measurement target from a plurality of directions has been known (for example, refer to Patent Document 1, Japanese Translation of PCT International Application Publication Number JP-T-2019-507885.) In such a measurement apparatus, calibration of the apparatus has been performed by capturing the same calibration jig with the plurality of imaging apparatuses or by capturing a calibration jig having known dimensions with the plurality of imaging apparatuses. Also, an alignment method called a pairwise alignment has been known (for example, see Non-Patent Document 1, Toru Tamaki, "Pose Estimation and Rotation Matrix", IEICE Technical Report, The Institute of Electronics, Information and Communication Engineers, 2009, SIP2009-48 and SIS2009-23, pp. 59 to 64.)

However, it was difficult for a plurality of imaging apparatuses to capture the same calibration jig in a case of a measurement apparatus that measures a three-dimensional geometry of a large measurement target, a measurement apparatus that measures a three-dimensional geometry of a complicated measurement target, or the like since the plurality of imaging apparatuses are disposed at various positions in such a case. Further, it is conceivable to use a large calibration jig, a calibration jig having a complicated shape, or the like according to the size of the measurement target, but it is relatively difficult to measure precise dimensions of such a calibration jig. Even if the dimensions of such a calibration jig can be measured, it is difficult to easily perform calibration on the measurement apparatus since the dimensions may be varied due to environmental changes or the like, or impact may cause dimensional deviation or the like.

BRIEF SUMMARY OF THE INVENTION

The present disclosure focuses on these points, and its object is to easily calibrate a measurement apparatus that measures a three-dimensional geometry of a large measurement target.

A first aspect of the present disclosure provides a calibration method in which a computer calibrates, using a calibration jig, a measurement apparatus that measures a three-dimensional geometry of a measurement target and includes a plurality of imaging parts that capture the measurement target, the calibration method including: a first imaging step of imaging a first element to be measured among a plurality of elements to be measured having a predetermined shape with a first imaging part and imaging a second element to be measured, which is different from the first element to be measured, with a second imaging part, which is different from the first imaging part, the plurality of elements to be measured being included in the calibration jig; a second imaging step of imaging the first element to be measured with the first imaging part and imaging the second element to be measured with the second imaging part, after causing the calibration jig to be moved in a predetermined first direction after the first imaging step; a third imaging step of imaging the first element to be measured with the first imaging part and imaging the second element to be measured with the second imaging part, after causing the calibration jig to be moved in a predetermined second direction different from the first direction after the second imaging step; a fourth imaging step of imaging the first element to be measured with the first imaging part and imaging the second element to be measured with the second imaging part; a fifth imaging step of imaging the first element to be measured with the first imaging part and imaging the second element to be measured with the second imaging part, after rotating the calibration jig about an axis oriented in a predetermined third direction after the fourth imaging step; a sixth imaging step of imaging the first element to be measured with the first imaging part and imaging the second element to be measured with the second imaging part, after rotating the calibration jig about an axis oriented in a predetermined fourth direction different from the third direction after the fifth imaging step; a step of identifying a first coordinate position indicating a position of the first element to be measured in a first coordinate system based on a field of view of the first imaging part in a plurality of captured images captured by the first imaging part, and a second coordinate position indicating a position of the second element to be measured in a second coordinate system based on a field of view of the second imaging part in a plurality of captured images captured by the second imaging part; a step of identifying a first rotation matrix for rotating the first coordinate system to perform a coordinate transformation and a second rotation matrix for rotating the second coordinate system to perform a coordinate transformation such that a direction in which the first coordinate position is moved and a direction in which the second coordinate position is moved coincide with each other before and after moving of the calibration jig in the first direction and the second direction; and a step of identifying a first translation vector for translating the first coordinate system and a second translation vector for translating the second coordinate system such that a distance between the first element to be measured and the second element to be measured is the same before and after rotating the calibration jig.

A second aspect of the present disclosure provides a calibration method in which a computer calibrates, using a calibration jig, a measurement apparatus that measures a three-dimensional geometry of a measurement target and includes a plurality of imaging parts that capture the measurement target, the calibration method including: a first imaging step of imaging a first element to be measured among a plurality of elements to be measured having a predetermined shape with a first imaging part and imaging a second element to be measured, which is different from the first element to be measured, with a second imaging part, which is different from the first imaging part, the plurality of elements to be measured being included in the calibration jig; a second imaging step of imaging the first element to be measured with the first imaging part and imaging the second element to be measured with the second imaging part, after causing the calibration jig to be moved in a predetermined first direction after the first imaging step; a third imaging step of imaging the first element to be measured with the first imaging part and imaging the second element to be measured with the second imaging part, after causing the calibration jig to be moved in a predetermined second direction different from the first direction after the second imaging step; a fourth imaging step of imaging the first element to be measured with the first imaging part and imaging the second element to be measured with the second imaging part; a fifth imaging step of imaging the first element to be measured with the first imaging part and imaging the second element to be measured with the second imaging part, after rotating the calibration jig about an axis oriented in a predetermined third direction after the fourth imaging step; a sixth imaging step of imaging the first element to be measured with the first imaging part and imaging the second element to be measured with the second imaging part, after rotating the calibration jig about an axis oriented in a predetermined fourth direction different from the third direction after the fifth imaging step; and a step of calibrating the measurement apparatus on the basis of the capturing results of the first imaging part and the second imaging part.

A third aspect of the preset disclosure provides a measurement system including: the measurement apparatus that measures a three-dimensional geometry of the measurement target, and the calibration jig that has an element to be measured having a predetermined shape and is a jig for calibrating the measurement apparatus, wherein the calibration jig includes the first element to be measured and the second element to be measured having a predetermined shape, and the measurement apparatus includes: a moving part that moves the measurement target; a light source that radiates light onto the measurement target; a plurality of imaging parts that respectively capture a plurality of different regions of the measurement target; a control part that controls the moving part and the imaging parts to measure the three-dimensional geometry of the measurement target on the basis of capturing results of the plurality of imaging parts, wherein the control part causes the plurality of imaging parts to capture the first element to be measured and the second element to be measured before and after the moving of the calibration jig, while moving the calibration jig, and calibrates the measurement apparatus by executing the calibration method described in the first aspect.

BRIEF DESCRIPTION OF THE DRAWINGS

FIGS. 5A to 5C each show a first example of coordinate positions of elements to be measured 31 identified by a measurement part 243 according to the present embodiment.

DESCRIPTION OF THE PREFERRED EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration Example of a Measurement System S

Figure 1:
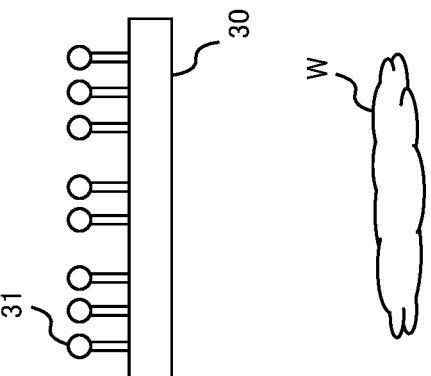
FIG. 1 shows a configuration example of a measurement system S according to the present embodiment.
Figure 1:
Figure 1:
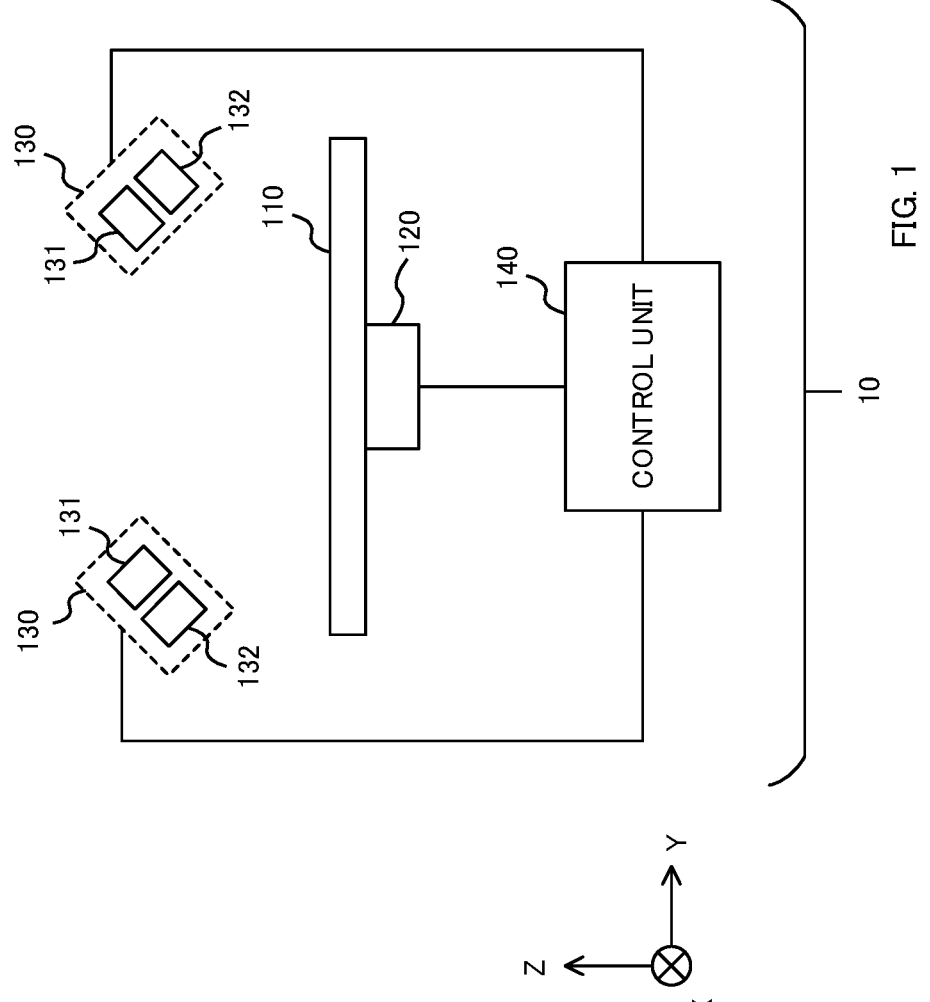

FIG. 1 shows a configuration example of a measurement system S according to the present embodiment. The measurement system S includes a measurement apparatus 10 and a calibration jig 30.

The measurement apparatus 10 measures a three-dimensional geometry of a measurement target W (hereinafter may be referred to as a workpiece W) by radiating light from a plurality of directions onto the measurement target W disposed in a three-dimensional space and receiving reflected light. Further, the measurement apparatus 10 radiates light from a plurality of directions onto the calibration jig 30 disposed in the three-dimensional space and identifies calibration parameters used for a calibration of the measurement apparatus 10 itself by receiving reflected light. The measurement apparatus 10 includes a stage 110, a moving part 120, an optical unit 130, and a control unit 140.

The stage 110 has the measurement target W mounted thereon. When the measurement system S performs calibration on the measurement apparatus 10, the stage 110 has the calibration jig 30 mounted thereon. The stage 110 is configured to be movable in a plurality of predetermined directions. In the present embodiment, an example in which the stage 110 is configured to be movable in a first direction and a second direction different from the first direction will be described. The first direction and the second direction are orthogonal, for example.

For example, the stage 110 has a function of an XY stage that is movable in an X-direction and a Y-direction in an XY plane. In this case, a first direction is the X-direction or the Y-direction, and a second direction is the Y-direction or the X-direction.

The stage 110 is configured to be rotatable about axes oriented in a plurality of predetermined directions. In the present embodiment, an example in which the stage 110 is configured to be respectively rotatable about axes oriented in a third direction and a fourth direction different from the third direction will be described. The third direction and the fourth direction are orthogonal, for example. Here, the first direction and the third direction may coincide with each other, or the second direction and the fourth direction may coincide with each other.

For example, the stage 110 has a function of a rotation stage rotatable about an axis oriented in the X-direction and a function of a rotation stage rotatable about an axis oriented in the Y-direction. In this case, the third direction is the X-direction or the Y-direction, and the fourth direction is the Y-direction or the X-direction. The measurement apparatus 10 needs to be configured so that the calibration jig 30 can be moved, and a movable arm or the like that can move while fixing the calibration jig 30 may be provided instead of the stage 110.

The moving part 120 moves the stage 110. In other words, the moving part 120 moves the measurement target W when the stage 110 has the measurement target W mounted thereon. When the stage 110 has the calibration jig 30 mounted thereon, the moving part 120 moves the calibration jig 30. The moving part 120 includes an actuator such as a motor, and moves the stage 110 in the first direction or the second direction. Further, the moving part 120 rotates the stage 110 about the axis oriented in the third direction.

Similarly, the moving part 120 rotates the stage 110 about the axis oriented in the fourth direction.

The optical unit 130 includes a light source 131 and an imaging part 132. The light source 131 radiates light onto the measurement target W. The light source 131 includes at least one of a halogen lamp, LED, laser beam, or the like. The light source 131 is a projector that radiates light with a predetermined pattern, for example. The light emitted from the light source 131 is reflected by the measurement target W. The imaging part 132 captures the measurement target W when reflected light from the measurement target W is incident on the imaging part 132. The imaging part 132 includes a camera capable of capturing a still image, video, and the like. The imaging part 132 may include a plurality of cameras.

A plurality of the optical units 130 are provided at different positions of the measurement apparatus 10. In other words, a plurality of light sources 131 radiate light onto different regions of the measurement target W, and a plurality of imaging parts 132 respectively capture a plurality of different regions of the measurement target W. The imaging parts 132 of the plurality of optical units 130 respectively capture different portions of the measurement target W, for example. In this case, it is desirable that the plurality of optical units 130 are disposed so that the overall configuration of the measurement target W can be grasped by combining a plurality of capturing results obtained by the plurality of imaging parts 132. An example in which two optical units 130 are disposed is described in the present embodiment for the sake of simplicity, but the present disclosure is not limited thereto. Three or more optical units 130 may be disposed.

The control unit 140 controls the moving part 120 and the optical units 130. When the stage 110 has the measurement target W mounted thereon, the control unit 140 acquires capturing results of the measurement target W taken by the imaging parts 132 from the optical units 130, and measures the three-dimensional geometry of the measurement target W on the basis of the acquired capturing results. When the stage 110 has the calibration jig 30 mounted thereon, the control unit 140 acquires capturing results of the calibration jig 30 taken by the imaging parts 132 from the optical units 130, and identifies the calibration parameters to be used for the calibration of the measurement apparatus 10 on the basis of the acquired capturing results. The control unit 140 will be described later.

The calibration jig 30 includes a plurality of elements to be measured 31 having a predetermined shape, and is a jig for calibrating the measurement apparatus 10. When the calibration jig 30 is mounted on the stage 110, it is desirable that the plurality of elements to be measured 31 are provided such that the plurality of elements to be measured 31 are included in the field of view of the imaging part 132 included in one optical unit 130.

Figure 2:
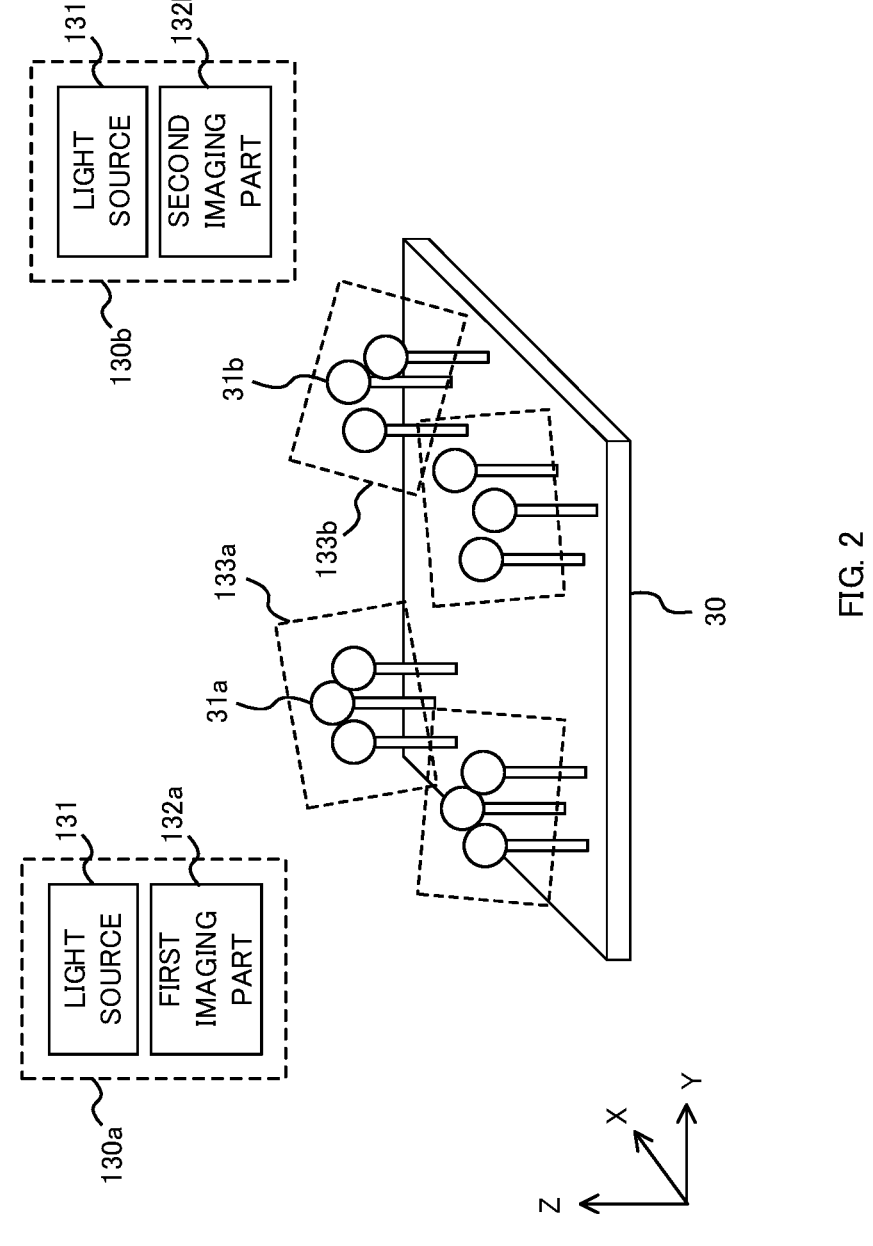
FIG. 2 shows an example in which a measurement apparatus 10 according to the present embodiment has a calibration jig 30 mounted thereon.

FIG. 2 shows an example in which the measurement apparatus 10 according to the present embodiment has the calibration jig 30 mounted thereon. FIG. 2 shows an example in which a first element to be measured 31a is in a field of view 133a of a first imaging part 132a of a first optical unit 130a, and a second element to be measured 31b is in a field of view 133b of a second imaging part 132b of a second optical unit 130b.

In the present embodiment, an example is shown in which different elements to be measured 31 are included in the field of view 133a of the first imaging part 132a and the field of view 133b of the second imaging part 132b, but the present embodiment is not limited thereto. For example, a part or the entirety of the first element to be measured 31a may be in the field of view 133a of the first imaging part 132a, and a part or the entirety of the first element to be measured 31a may be in the field of view 133b of the second imaging part 132b.

Each optical unit 130 can capture the element to be measured 31 in its field of view by radiating the light from the light source 131 onto the calibration jig 30 and capturing an image with the imaging part 132. Then, the control unit 140 acquires the capturing results from the imaging parts 132 and measures the three-dimensional geometry of the element to be measured 31. The element to be measured 31 has a predetermined size and a predetermined shape. The element to be measured 31 may be formed to have predetermined dimensions. The element to be measured 31 may have different shapes, marks, colors, and the like. In the present embodiment, an example will be described in which the element to be measured 31 takes a shape of a ball and the control unit 140 measures the center position of the ball.

Here, the dimensions and positional relationship of the plurality of elements to be measured 31 provided in the calibration jig 30 may be known in advance. In this case, the control unit 140 can calibrate the measurement apparatus 10 by comparing (i) the known dimensions and positional relationship of the elements to be measured 31 and (ii) a measurement result of the three-dimensional geometry of the element to be measured 31. For example, the control unit 140 identifies coefficients or the like to be multiplied by the measurement result of the three-dimensional geometry as the calibration parameters so that the measurement result of the three-dimensional geometry of the element to be measured 31 matches the dimensions and positional relationship of the elements to be measured 31.

However, in the case of the measurement apparatus 10 for measuring a large measurement target, the calibration jig 30 also becomes large, and it was sometimes difficult to measure precise dimensions. Also, in the case of the measurement apparatus 10 for measuring a complicated measurement target, the shape, disposition, and the like of the calibration jig 30 become complicated, and it was sometimes difficult to measure precise dimensions.

On the other hand, even if the dimensions of such a calibration jig 30 can be measured, the dimensions may be varied due to environmental changes or the like, or impact may cause dimensional deviation or the like, and therefore it was difficult to easily calibrate the measurement apparatus 10. Therefore, a measurement system S according to the present embodiment makes it possible to calibrate such a measurement apparatus 10 even with a calibration jig 30 having a plurality of elements to be measured 31 whose dimensions and positional relationship are not known. The control unit 140 of said measurement apparatus 10 will now be described.

Configuration Example of the Control Unit 140

Figure 3:
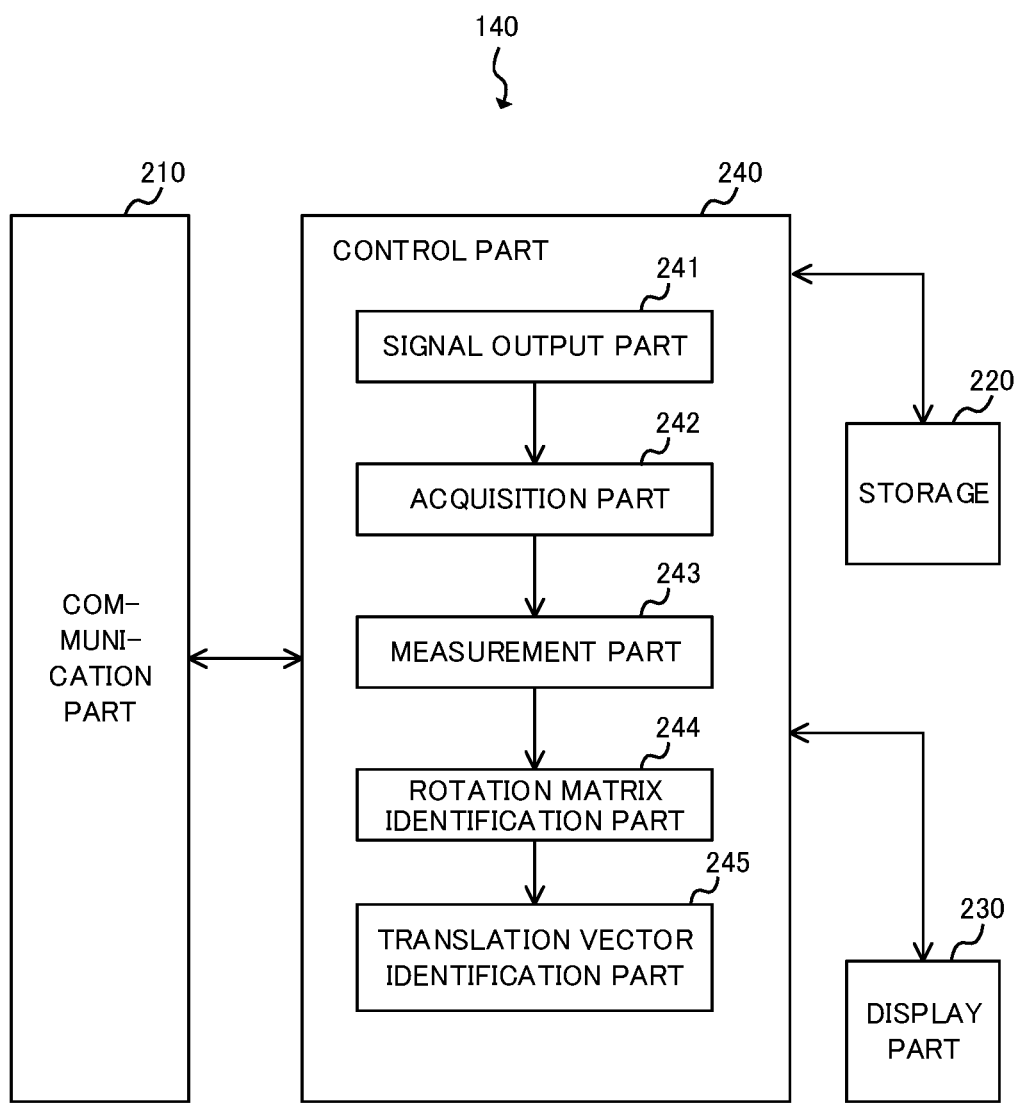
FIG. 3 shows a configuration example of a control unit 140 according to the present embodiment.

FIG. 3 shows a configuration example of the control unit 140 according to the present embodiment. The control unit 140 is a computer, for example. The control unit 140 includes a communication part 210, a storage 220, a display part 230, and a control part 240.

The communication part 210 communicates with the moving part 120 and the optical unit 130. The communication part 210 transmits a control signal for moving the measurement target W or the calibration jig 30 to the moving part 120, for example. The communication part 210 may transmit a control signal for controlling the light source 131 and the imaging part 132 to the optical unit 130. The communication part 210 may receive the capturing result of the imaging part 132 from the optical unit 130.

The communication part 210 communicates via a dedicated connection line, a communication network, and the like. The communication part 210 may function as an interface for connecting to the communication network such as an Internet line, a wireless LAN, or a mobile phone network.

The storage 220 includes a storage medium such as a ROM (Read Only Memory), a RAM (Random Access Memory), or the like, for example. The storage 220 may include a large-capacity storage device like a hard disk drive (HDD) and/or a solid state drive (SSD). For example, when the computer functions as the control unit 140, the storage 220 may store an OS (Operating System) that causes the computer to function, and information such as a program. The storage 220 may store various types of information including data to be referred to at the time of executing the program.

The storage 220 may store intermediate data, calculation results, thresholds, reference values, parameters, and the like, which are generated (or used) in an operation process of the control unit 140. Further, in response to a request from each part of the control unit 140, the storage 220 may provide the stored data to a request source.

The display part 230 displays information about measurement of the measurement apparatus 10. The display part 230 displays information such as measurement conditions, measurement items, and measurement results. The display part 230 may display a communication state of the control unit 140, an OS, an execution state of applications, and the like. The display part 230 is a display such as a liquid crystal display or a monitor, for example.

The control part 240 controls each part of the measurement apparatus 10. For example, the control part 240 transmits and receives various types of information via the communication part 210. The control part 240 is a CPU (Central Processing Unit), for example. The control part 240 controls the moving part 120 and the imaging parts 132 to measure the three-dimensional geometry of the measurement target W on the basis of the capturing results of the plurality of imaging parts 132.

The control part 240 includes a signal output part 241, an acquisition part 242, a measurement part 243, a rotation matrix identification part 244, and a translation vector identification part 245. In other words, the CPU functions as the control part 240 including the signal output part 241, the acquisition part 242, the measurement part 243, the rotation matrix identification part 244, and the translation vector identification part 245 by executing the program stored in the storage 220.

The signal output part 241 outputs a control signal for controlling each part of the measurement apparatus 10 to the communication part 210. The signal output part 241 outputs a control signal for controlling the light source 131 and the imaging part 132 of the optical unit 130, for example. As an example, the signal output part 241 outputs a control signal for causing the light source 131 of one optical unit 130 to emit light in a predetermined pattern and a control signal for causing the imaging part 132 of one optical unit 130 to capture an image. By doing this, the communication part 210 transmits the control signals to the one optical unit 130, and the one optical unit 130 captures an image of an object (e.g., the element to be measured 31) in its field of view.

The signal output part 241 outputs a control signal for driving the moving part 120. The signal output part 241 may output a control signal for causing the display part 230 to display information or the like. The signal output part 241 may generate a control signal corresponding to an operation purpose or may output a control signal with a predetermined signal pattern. The signal pattern of the control signal may be stored in the storage 220.

The acquisition part 242 acquires data of the captured image captured by the imaging part 132 of the optical unit 130 as the capturing result. The acquisition part 242 may store the acquired capturing result of the imaging part 132 in the storage 220. The acquisition part 242 may also acquire information about the current position of the stage 110.

The measurement part 243 measures the three-dimensional geometry of the measurement target W or the calibration jig 30 on the basis of the capturing result of the imaging part 132 acquired by the acquisition part 242. The measurement part 243 measures a length of a predetermined portion, dimensions of a predetermined shape, and the like of the measurement target W, for example. By using the capturing results of the plurality of imaging parts 132, the measurement part 243 can also measure the length and shape of a predetermined portion of the measurement target W which cannot fit in the field of view of one imaging part 132. Since the operation in which the measurement part 243 measures the three-dimensional geometry of the measurement target W from the capturing results of the plurality of imaging parts 132 is well known, a detailed description thereof is omitted here.

The rotation matrix identification part 244 identifies a rotation matrix used for the calibration of the measurement apparatus 10. The translation vector identification part 245 identifies a translation vector used for the calibration of the measurement apparatus 10. The operations of the rotation matrix identification part 244 and the translation vector identification part 245 will be described below.

Example of an Operation Flow of the Measurement Apparatus 10

Figure 4:
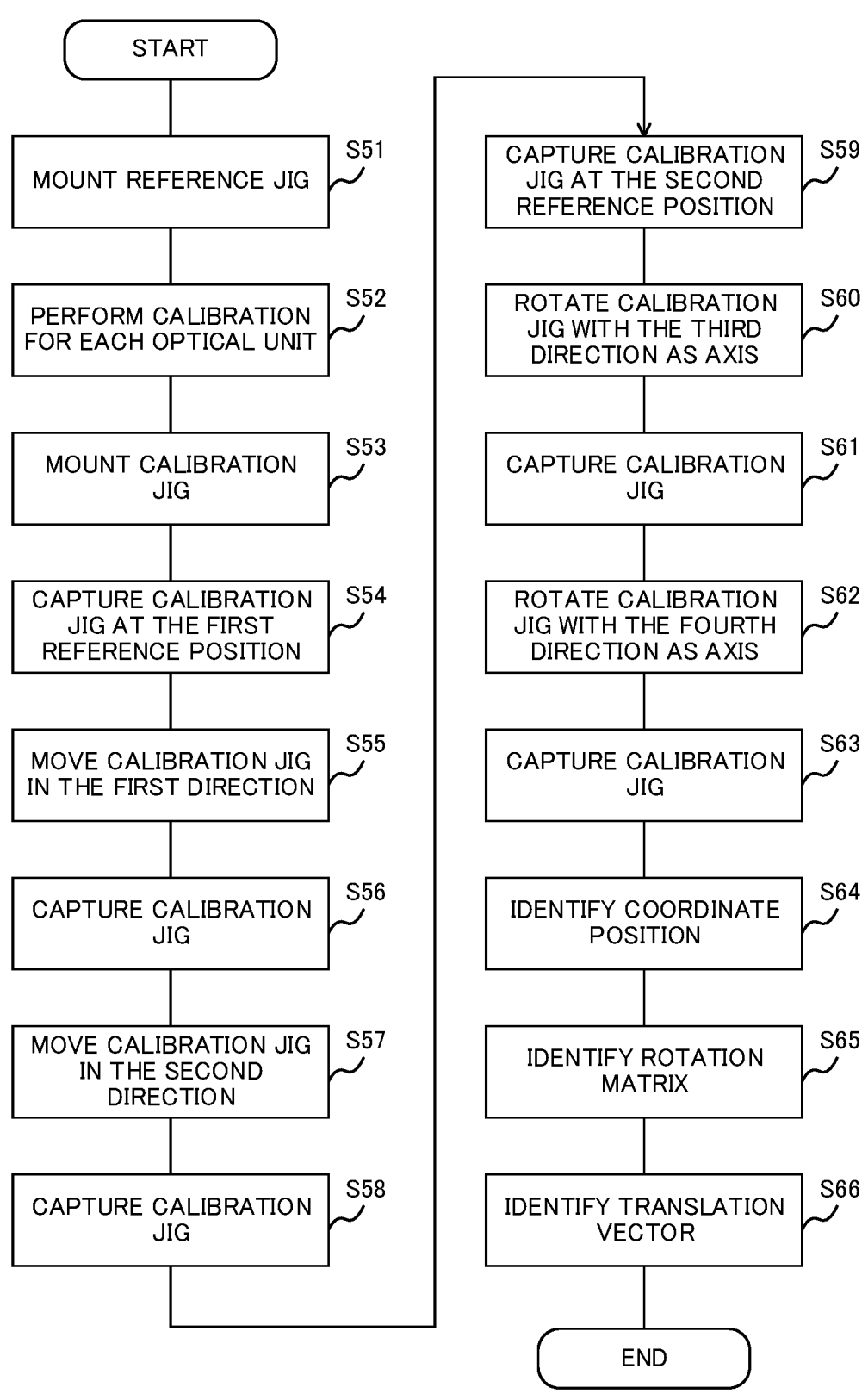
FIG. 4 shows an example of an operation flow of the measurement apparatus 10 according to the present embodiment.

FIG. 4 shows an example of an operation flow of the measurement apparatus 10 according to the present embodiment. The measurement apparatus 10 executes operations from S51 to S66 shown in FIG. 4 to identify the calibration parameters used for the calibration of the measurement apparatus 10 itself. Although the measurement apparatus 10 includes the plurality of optical units 130, in this operation flow, an operation example using the first optical unit 130a and the second optical unit 130b will be described in a simplified manner.

First, the measurement apparatus 10 performs calibration for each optical unit 130 before calibrating the measurement apparatus 10 using the calibration jig 30. In this case, the measurement apparatus 10 calibrates each optical unit 130 using a reference jig that is smaller in size than the calibration jig 30. The size of the reference jig is a size that fits in the field of view of the imaging part 132 included in one optical unit 130, for example.

The reference jig has a plurality of reference measuring elements, for which at least one of dimensions or positional relationship is known. The reference measuring element, as an example, has approximately the same shape as the element to be measured 31. Alternatively, the reference jig may have a shape with known dimensions. Such a small reference jig shows little change over time and is a commonly used jig that is easy to handle. Since the calibration for each optical unit 130 using such a reference jig is well known, the operation of the calibration will be briefly described here.

First, the stage 110 of the measurement apparatus 10 is mounted with a reference jig thereon (S51). A plurality of reference jigs may be mounted on the stage 110, or instead, one reference jig may be mounted thereon. In a case where a plurality of reference jigs are mounted on the stage 110, it is desirable to dispose the plurality of reference jigs such that they are included in the respective fields of view of the optical units 130. Then, the control part 240 performs calibration for each optical unit 130 (S52).

For example, the control part 240 captures the reference jig with the first imaging part 132*a* of the first optical unit 130*a*, and calibrates a first coordinate system indicating first coordinate positions in the field of view 133*a* of the first imaging part 132*a* on the basis of a capturing result of the first imaging part 132*a*. Then, the control part 240 identifies a first coefficient to be multiplied by the measurement result of the three-dimensional geometry so that the measurement result of the three-dimensional geometry of the reference measuring element of the reference jig matches the known dimensions and positional relationship of the reference measuring element.

Next, the control part 240 captures the reference jig with the second imaging part 132*b* of the second optical unit 130*b*, and calibrates a second coordinate system indicating second coordinate positions in the field of view 133*b* of the second imaging part 132*b* on the basis of a capturing result of the second imaging part 132*b*. In a case where one reference jig is mounted on the stage 110, when the calibration of the first optical unit 130*a* is finished, the control part 240 causes the stage 110 to be moved such that the reference jig is included in the field of view of the second optical unit 130*b*, which will be calibrated next, and then begins the calibration of the second optical unit 130*b*, for example.

In a similar manner as in the calibration of the first optical unit 130*a*, the control part 240 identifies a second coefficient to be multiplied by the measurement result of the three-dimensional geometry so that the measurement result of the three-dimensional geometry of the reference measuring element based on the capturing result of the second imaging part 132*b* matches the known dimensions and positional relationship of the reference measuring element. As described above, the control part 240 calibrates each of the plurality of optical units 130. The control part 240 may store the identified coefficients in the storage 220.

Next, the stage 110 of the measurement apparatus 10 has the calibration jig 30 mounted thereon (S53). Next, the control part 240 captures the calibration jig 30 disposed at a first reference position (S54). The first reference position is a predetermined position such as an initial position of the stage 110, for example. For example, when the calibration jig 30 is disposed at the first reference position, it is desirable that a positional relationship between the calibration jig 30, the plurality of optical units 130, and the first reference position is determined in advance such that a plurality of elements to be measured 31 of the calibration jig 30 are in the fields of view 133 of the plurality of imaging parts 132.

For example, the control part 240 causes the stage 110 to be moved and then disposes the calibration jig 30 at the first reference position. Then, after turning on the light sources 131 of the plurality of optical units 130, the control part 240 captures the calibration jig 30 by using the imaging parts 132. By doing this, at the first reference position, the first imaging part 132*a* captures the first element to be measured 31*a* from among the plurality of elements to be measured 31 included in the calibration jig 30, and the second imaging part 132*b*, which is different from the first imaging part

132*a*, captures the second element to be measured 31*b*, which is different from the first element to be measured 31*a*.

Next, the control part 240 causes the calibration jig 30 to be moved in a predetermined first direction from the first reference position (S55). For example, the control part 240 causes the stage 110 to be moved by a predetermined distance in the first direction. It is desirable that the control part 240 causes the stage 110 to be moved in the first direction within a range in which the plurality of elements to be measured 31 of the calibration jig 30 are included in the fields of view of the plurality of imaging parts 132.

Then, the control part 240 captures the calibration jig 30 by using the plurality of optical units 130 (S56). After turning on the light sources 131 of the plurality of optical units 130, the control part 240 captures the calibration jig 30 by using the imaging part 132. By doing this, the first imaging part 132*a* captures the first element to be measured 31*a* that has been moved in the first direction, and the second imaging part 132*b* captures the second element to be measured 31*b* that has been moved in the first direction.

Next, the control part 240 causes the calibration jig 30 to be moved in a predetermined second direction, different from the first direction, from the first reference position (S57). For example, after moving the stage 110 back to the first reference position, the control part 240 causes the stage 110 to be moved by a predetermined distance in the second direction. Alternatively, after causing the stage 110 to be moved by the predetermined distance in the second direction, the control part 240 may move the stage 110 back by the distance moved in S55 in the direction opposite to the first direction.

Alternatively, the control part 240 may cause the stage 110 to be moved by the predetermined distance in the second direction and subtract the distance moved in S55 from the measurement result. It is desirable that the control part 240 causes the stage 110 to be moved in the second direction within the range in which the plurality of elements to be measured 31 of the calibration jig 30 are included in the fields of view of the plurality of imaging parts 132.

Then, the control part 240 captures the calibration jig 30 by using the plurality of optical units 130 (S58). The control part 240 captures the calibration jig 30 by the same operation as in S56. By doing this, the first imaging part 132*a* captures the first element to be measured 31*a* that has been moved in the second direction, and the second imaging part 132*b* captures the second element to be measured 31*b* that has been moved in the second direction.

Next, the control part 240 captures the calibration jig 30 disposed at a second reference position (S59). The second reference position is a predetermined position such as the initial position of the stage 110, for example. Similarly to the first reference position, the second reference position is a position at which the plurality of elements to be measured 31 of the calibration jig 30 are in the fields of view 133 of the plurality of imaging parts 132, when the calibration jig 30 is disposed at said second reference position.

For example, after causing the stage 110 to move to the second reference position, the control part 240 captures the calibration jig 30 by using the imaging part 132 in the same manner as in the operation in S54. The second reference position may be the position of the calibration jig 30 after having been moved in the second direction. In this case, since the operation in S59 has the same result as the operation in S58, the operation in S59 may be omitted. Further, the second reference position may be the same position as the first reference position, and in this case, since the operation in S59 has the same result as the operation in S54, the control part 240 may simply move the calibration jig 30 to the second reference position.

Next, the control part 240 causes the calibration jig 30 to be rotated in a predetermined direction about an axis oriented in a predetermined third direction (S60). For example, the control part 240 causes the stage 110 to be rotated by a predetermined angle θ within a range in which the plurality of elements to be measured 31 of the calibration jig 30 are in the fields of view 133 of the plurality of imaging parts 132.

Then, the control part 240 captures the calibration jig 30 by using the plurality of optical units 130 (S61). The control part 240 captures the calibration jig 30 by performing the same operation as in S56. As a result, the first imaging part 132a captures the first element to be measured 31a after the rotation about the axis oriented in the third direction, and the second imaging part 132b captures the second element to be measured 31b after the rotation about the axis oriented in the third direction.

Next, the control part 240 causes the calibration jig 30 to be rotated in a predetermined direction about an axis oriented in a predetermined fourth direction, which is different from the third direction (S62). For example, after rotating the stage 110 back by the predetermined angle θ about the axis oriented in the third direction, the control part 240 causes the stage 110 to be rotated by a predetermined angle φ about the axis oriented in the fourth direction, within the range in which the plurality of elements to be measured 31 of the calibration jig 30 are in the fields of view 133 of the plurality of imaging parts 132.

Alternatively, after causing the stage 110 to be rotated by the predetermined angle φ about the axis oriented in the fourth direction, the control part 240 may rotate the stage 110 back by the predetermined angle θ about the axis oriented in the third direction. Alternatively, the control part 240 may cause the stage 110 to be rotated by the predetermined angle φ about the axis oriented in the fourth direction, and subtract an amount of a rotation of the stage 110 rotated by the predetermined angle φ about the axis oriented in the fourth direction from the measurement result.

The control part 240 captures the calibration jig 30 using the plurality of optical units 130 (S63). The control part 240 captures the calibration jig 30 by the same operation as in S61. As described above, the control part 240 outputs the control signal from the signal output part 241, and captures, while moving the calibration jig 30, the elements to be measured 31 with the plurality of imaging parts 132 before and after the moving of the calibration jig 30. Then, the acquisition part 242 acquires the capturing results of the imaging parts 132.

In FIG. 4, an example has been described in which the control part 240 executes the following: moving the calibration jig 30 in the first direction, moving it in the second direction, rotating it by the angle θ, and rotating it by the angle φ, in this order, but the present disclosure is not limited thereto. The control part 240 may execute the moving the calibration jig 30 in the first direction, moving it in the second direction, rotating it by the angle θ, and rotating it by the angle φ in an order different from that of FIG. 4.

Next, the control part 240 identifies a coordinate position of the element to be measured 31 for each position to which the calibration jig 30 was moved, on the basis of the capturing results of the plurality of imaging parts 132 (S64). For example, the measurement part 243 identifies first coordinate positions indicating a position of the first element to be measured 31a in the first coordinate system based on the field of view of the first imaging part 132a in a plurality of captured images captured by the first imaging part 132a. Further, the measurement part 243 identifies second coordinate positions indicating a position of the second element to be measured 31b in the second coordinate system based on the field of view of the second imaging part 132b in a plurality of captured images captured by the second imaging part 132b.

First Example of the Coordinate Positions of the Element to be Measured 31

Figures 5A, 5B, 5C:
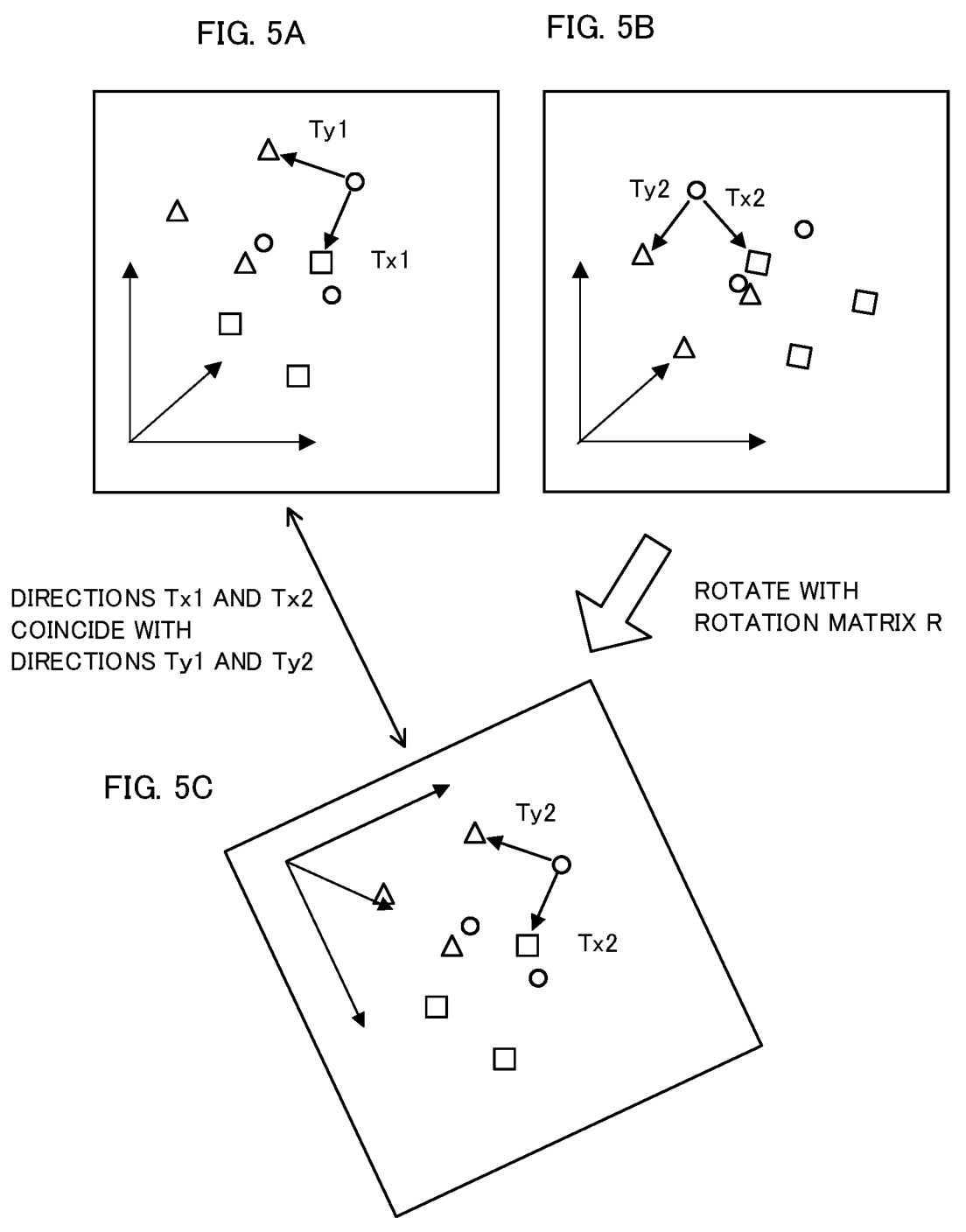

FIGS. 5A to 5C each show a first example of the coordinate positions of the elements to be measured 31 identified by the measurement part 243 according to the present embodiment. FIGS. 5A to 5C each show an example in which the measurement part 243 measures the center positions of three ball-shaped elements to be measured 31 on the basis of a result of the operations from S53 to S58 shown in FIG. 4, and plotted coordinate positions of the measurement results. It is desirable that the measurement part 243 calculates the coordinate positions of the measurement results using the first coefficient and the second coefficient identified in the calibration operations from S51 to S52.

FIG. 5A shows the first coordinate system based on the capturing result of the first imaging part 132a. For example, the first coordinate positions denoted by circles indicate the coordinate positions of the first element to be measured 31a at the first reference position. The first coordinate positions denoted by squares indicate the coordinate positions of the first element to be measured 31a having been moved in the first direction from the first reference position, and the first coordinate positions denoted by triangles indicate the coordinate positions of the first element to be measured 31a having been moved in the second direction from the first reference position. In the first coordinate system shown in FIG. 5A, the first direction is Tx1, and the second direction is Ty1.

FIG. 5B shows the second coordinate system based on the capturing result of the second imaging part 132b. For example, the second coordinate positions denoted by circles indicate the coordinate positions of the second element to be measured 31b at the first reference position. The second coordinate positions denoted by squares indicate the coordinate positions of the second element to be measured 31b having been moved in the first direction from the first reference position, and the second coordinate positions denoted by triangles indicate the coordinate positions of the second element to be measured 31b having been moved in the second direction from the first reference position. In the second coordinate system shown in FIG. 5B, the first direction is Tx2, and the second direction is Ty2.

The measurement results of the coordinate positions of the same coordinate, such as shown in FIGS. 5A to 5C, can be measured with the accuracy of the device performance if each of the optical units 130 has been calibrated by the operations from S51 to S52 or the like. For example, a distance between two different first elements to be measured 31a in FIG. 5A approximately coincides with a distance between the actual first elements to be measured 31a. Similarly, a distance between two different second elements to be measured 31b in FIG. 5B approximately coincides with a distance between the actual second elements to be measured 31b as well.

However, since calibration between a plurality of different optical units 130 (may be referred to as group calibration) has not been performed, a distance between certain coordinate positions of different coordinates cannot be measured with the accuracy of the device performance. For example, a distance between a coordinate position of one first element to be measured 31*a* in the first coordinate system shown in FIG. 5A and a coordinate position of one second element to be measured 31*b* in the second coordinate system shown in FIG. 5B does not need to coincide with a distance between the actual first element to be measured 31*a* and the actual second element to be measured 31*b*.

Therefore, to perform group calibration, the control part 240 first identifies a matrix that performs a coordinate transformation such that a first direction Tx1 approximately coincides with a first direction Tx2 in FIG. 5B and a second direction Ty1 in FIG. 5A approximately coincides with a second direction Ty2 in FIG. 5B. By identifying such a rotation matrix, the control part 240 can calibrate a moving direction when the calibration jig 30 (a measurement target M) is moved between the plurality of different optical units 130.

In other words, after the operation in S64 in FIG. 4, the rotation matrix identification part 244 of the control part 240 identifies a rotation matrix for rotating the coordinates such that a direction in which the first coordinate position is moved and a direction in which the second coordinate position is moved coincide with each other before and after the moving of the calibration jig 30 in the first direction and the second direction (S65). The rotation matrix includes a first rotation matrix rotating the first coordinate system to perform the coordinate transformation, and a second rotation matrix rotating the second coordinate system to perform the coordinate transformation. Details of the operation in S65 will be described later.

Second Example of the Coordinate Positions of the Element to be Measured 31

Figures 6A, 6B, 6C:
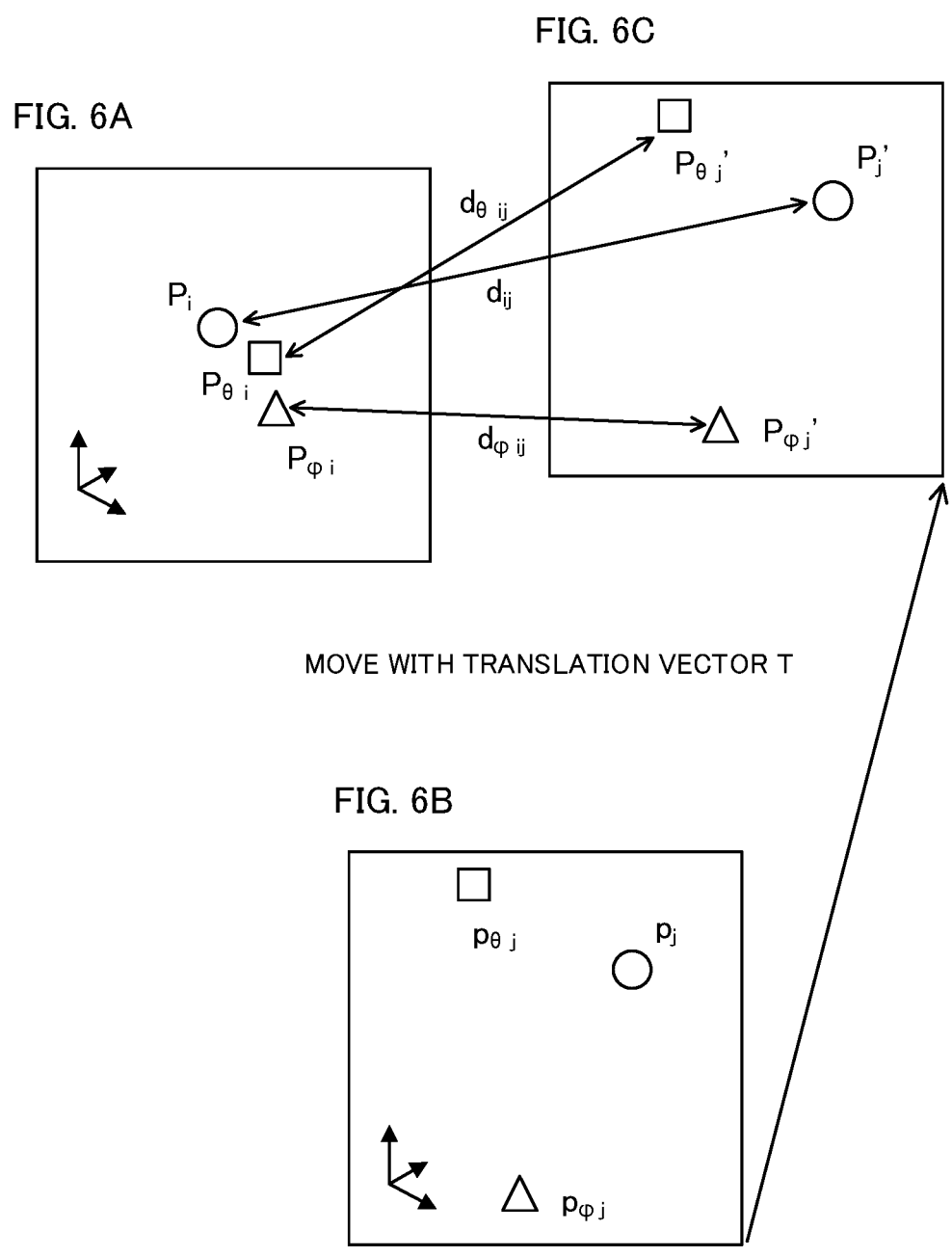
FIGS. 6A to 6C each show a second example of the coordinate positions of the elements to be measured 31 identified by the measurement part 243 according to the present embodiment.

Next, the control part 240 calibrates a translational direction between a plurality of different optical units 130. FIGS. 6A to 6C each show a second example of the coordinate positions of the elements to be measured 31 identified by the measurement part 243 according to the present embodiment. FIGS. 6A to 6C each show an example in which the measurement part 243 measures the center position of one ball-shaped element to be measured 31 on the basis of a result of the operations from S59 to S63 of FIG. 4, and plotted coordinate positions of the measurement results.

It is desirable that the measurement part 243 calculates the coordinate positions of the measurement results using the first coefficient and the second coefficient identified in the calibration operations from S51 to S52. Further, when the rotation matrix identification part 244 identifies the rotation matrix in S65, it is desirable that the measurement part 243 performs a coordinate transformation on the coordinate positions of the measurement results by using the identified rotation matrix.

FIG. 6A shows the first coordinate system based on the capturing result of the first imaging part 132*a*. For example, the first coordinate position denoted by a circle indicates a reference position $P_i$ of the i-th first element to be measured 31*a* at the second reference position. The first coordinate position denoted by a square indicates a first rotational position $P_{\varphi i}$ of the i-th first element to be measured 31*a* rotated by the angle θ about the axis oriented in the third direction from the first reference position, and the first coordinate position denoted by a triangle indicates a second rotational position $P_{\varphi i}$ of the i-th first element to be measured 31*a* rotated by the angle φ about the axis oriented in the fourth direction from the first reference position.

FIG. 6B shows the second coordinate system based on the capturing result of the second imaging part 132*b*. For example, the second coordinate position denoted by a circle indicates a reference position $P_j$ of the j-th second element to be measured 31*b* at the second reference position. The second coordinate position denoted by a square indicates a first rotational position $P_{\theta j}$ of the j-th second element to be measured 31*b* rotated by the angle θ about the axis oriented in the third direction from the second reference position, and the second coordinate position denoted by a triangle indicates a second rotational position $P_{\varphi j}$ of the j-th second element to be measured 31*b* rotated by the angle φ about the axis oriented in the fourth direction from the second reference position.

Here, the distance between the first element to be measured 31*a* and the second element to be measured 31*b* does not change before and after the rotation of the calibration jig 30. However, if group calibration is not performed, a measurement result of the distance between the first element to be measured 31*a* and the second element to be measured 31*b* may change before and after the rotation by exceeding the allowable value of measurement error.

Therefore, in the example of FIGS. 6A to 6C, the translation vector identification part 245 identifies a translation vector that performs a coordinate transformation such that a distance from the reference position $P_i$ to the reference position $P_j$, a distance from the first rotation position $P_{\theta i}$ to the first rotation position $P_{\theta j}$, and a distance from the second rotation position $P_{\varphi i}$ to the second rotation position $P_{\varphi j}$ approximately coincide with each other, for example. By identifying such a translation vector, the control part 240 can perform calibration on distance measurement of the calibration jig 30 (measurement target M) among the plurality of different optical units 130.

In other words, in FIG. 4, after the operation in S65, the translation vector identification part 245 identifies a translation vector for translating the coordinates such that the distance between the first element to be measured 31*a* and the second element to be measured 31*b* is the same before and after the rotation. The translation vector includes a first translation vector translating the first coordinate system and a second translation vector translating the second coordinate system. Details of the operation in S66 will be described later. The control part 240 may store the identified rotation matrix and translation vector as the calibration parameters in the storage 220.

As described above, among the plurality of different optical units 130, the identified rotation matrix can calibrate the moving direction of the calibration jig 30 (measurement target M), and the identified translation vector can perform the calibration on the distance measurement of the calibration jig 30 (measurement target M). Therefore, the control part 240 can perform group calibration by using the rotation matrix and the translation vector identified by the above operations.

For example, after executing the operation flow shown in FIG. 4, the measurement apparatus 10 has the measurement target M mounted on the stage 110, and measures the three-dimensional geometry of the measurement target M using the first optical unit 130*a* and the second optical unit 130*b*. Then, the measurement part 243 coordinate-transforms the first coordinate system into a calibration coordinate system by rotating coordinate positions of the first coordinate system with the first rotation matrix and by translating the positions after the rotation by the first translation vector. Further, the measurement part 243 coordinate-transforms the second coordinate system into a calibration coordinate system by rotating coordinate positions of the second coordinate system with the second rotation matrix and by translating the coordinate positions after the rotation by the second translation vector.

By doing this, the control part 240 can output a measurement value of the three-dimensional geometry in the calibration coordinate system as a calibrated measurement value. The control part 240 may cause the display part 230 to display the calibrated measurement value or store it in the storage 220. Further, the control part 240 may output the calibrated measurement value to an external device via a network or the like.

As described above, in the measurement system S according to the present embodiment, even when the calibration jig 30 for which the dimensions and positional relationship of the plurality of elements to be measured 31 are not known is used, it is possible to identify the calibration parameters to be used for the calibration of the measurement system S itself and reflect them in the measurement result. Therefore, according to the measurement system S according to the present embodiment, it is possible to easily calibrate the measurement apparatus 10 that measures the three-dimensional geometry of the large measurement target W.

Example of an Operation Flow of the Control Part 240

Figure 7:
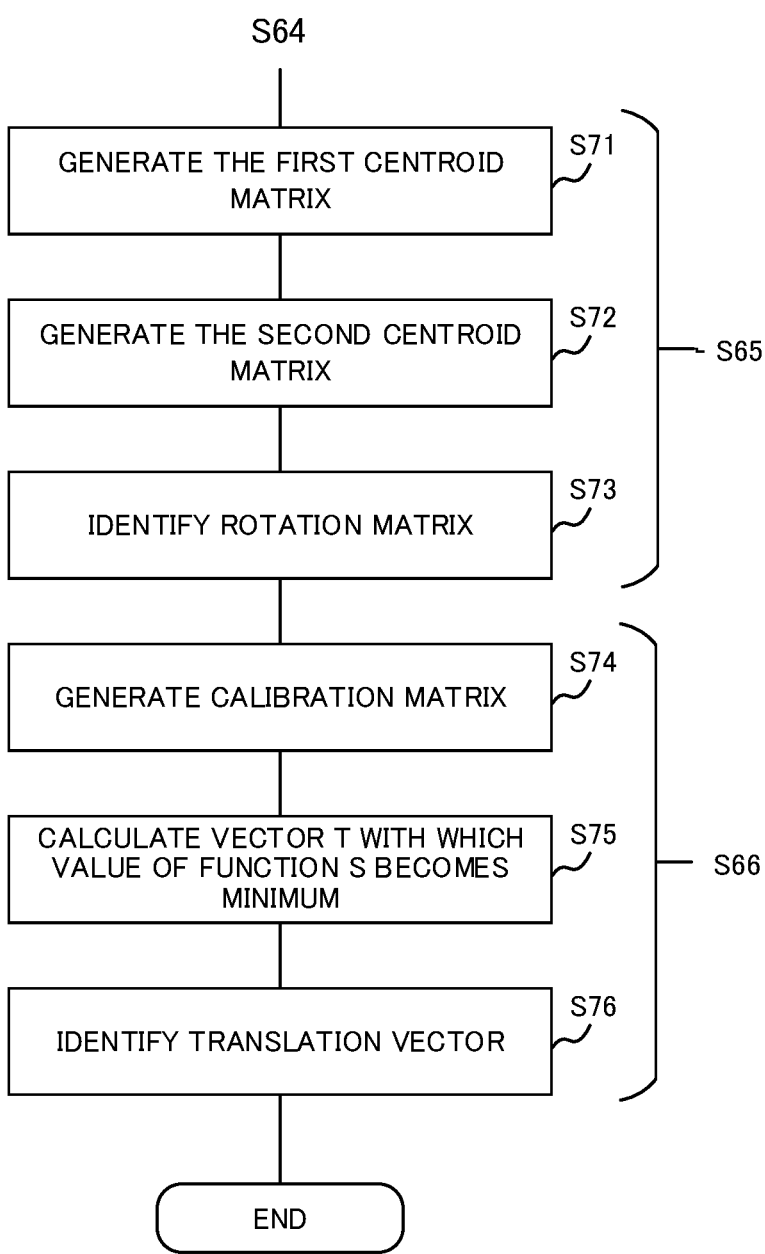
FIG. 7 shows an example of an operation flow of a control part 240 according to the present embodiment.

FIG. 7 shows an example of an operation flow of the control part 240 according to the present embodiment. FIG. 7 shows an example of the operation flow for explaining details of the operations in S65 and S66 among the operation flow of the measurement apparatus 10 shown in FIG. 4. For example, operations in S71 to S73 of FIG. 7 correspond to detailed operation in S65 of FIG. 4.

First, the rotation matrix identification part 244 generates a first centroid matrix x based on a matrix X1 indicating a first coordinate position, a matrix X2 indicating a first coordinate position after the calibration jig 30 is moved in the first direction, and a matrix X3 indicating a first coordinate position after the calibration jig 30 is moved in the second direction (S71).

The rotation matrix identification part 244 defines a matrix $x_{1i}$ indicating a first coordinate position of the i-th first element to be measured 31$a$ as an element of the matrix X1. The element $x_{1i}$ is a matrix of three rows and one column indicating one point in Cartesian coordinates, for example. In other words, the rotation matrix identification part 244 defines a matrix indicating N of the first coordinate positions, which is a result of measuring positions of N of the first elements to be measured 31$a$ by the first optical unit 130$a$, as the matrix X1=$[x_{11}, \ldots, x_{1N}]$, in which the number N of the first elements to be measured 31$a$ is defined as the number of elements.

Further, the rotation matrix identification part 244 defines a matrix $x_{2i}$ indicating the first coordinate position of the i-th first element to be measured 31$a$ after the calibration jig 30 is moved in the first direction as an element $x_{2i}$ of the matrix X2, and defines the matrix X2 as $[x_{21}, \ldots, x_{2N}]$. Similarly, a matrix $x_{3i}$ indicating the first coordinate position of the i-th first element to be measured 31$a$ after the calibration jig 30 is moved in the second direction is defined as an element $x_{3i}$ of the matrix X3, and the matrix X3 is defined as $[x_{31}, \ldots, x_{3N}]$.

Then, the rotation matrix identification part 244 calculates the centroids of the generated matrices X1, $x_2$, and X3, respectively, and generates a first centroid matrix x=$[x_1, x_2, x_3]$, which is a matrix having the calculated three centroids $x_1$, $x_2$, and $x_3$ as its elements. The centroid xx is calculated by the following equation, where (k=1, 2, 3).

$$x_k = \frac{1}{N} \sum_{i=1}^{N} x_{ki} \qquad \text{[Equation 1]}$$

Next, the rotation matrix identification part 244 generates a second centroid matrix y based on a matrix Y1 indicating the second coordinate position, a matrix Y2 indicating the second coordinate position after the calibration jig 30 is moved in the first direction, and a matrix Y3 indicating the second coordinate position after the calibration jig 30 is moved in the second direction (S72).

Similarly to the case of generating the first centroid matrix x, the rotation matrix identification part 244 defines a matrix indicating a second coordinate position of the i-th second element to be measured 31$b$ as an element $y_{1i}$. Then, the rotation matrix identification part 244 defines the matrix Y1 as $[y_{11}, \ldots, y_{1M}]$, in which the number M of the second elements to be measured 31$b$ is defined as the number of elements, defines the matrix Y2 whose element $y_{2i}$ is a matrix indicating the second coordinate position after the calibration jig 30 is moved in the first direction, as $[y_{21}, \ldots, y_{2M}]$, and defines the matrix Y3 whose element $y_{3i}$ is a matrix indicating the second coordinate position after the calibration jig 30 is moved in the second direction, as $[y_{31}, \ldots, y_{3M}]$.

The rotation matrix identification part 244 calculates the centroids of the generated matrices Y1, Y2, and Y3, respectively, and generates a matrix having three calculated centroids $y_1$, $y_2$, and $y_3$ as elements as a second centroid matrix y=$[y_1, y_2, y_3]$. The centroid $y_k$ is calculated by the following equation, where (k=1, 2, 3).

$$y_k = \frac{1}{M} \sum_{i=1}^{M} y_{ki} \qquad \text{[Equation 2]}$$

Next, the rotation matrix identification part 244 identifies a first rotation matrix and a second rotation matrix by performing a pairwise alignment on the coordinate position indicated by each element of the first centroid matrix x and the coordinate position indicated by each element of the second centroid matrix y (S73). Here, although the pairwise alignment is a known technique as described in Non-Patent Document 1, details are described below.

One Example of the Pairwise Alignment

Pairwise alignment of two data matrices is, for example, a technique of calculating a rotation matrix R and a translation vector t that associate corresponding points (elements) as shown in the following equation.

$$y_i \cong Rx_i + t \qquad \text{[Equation 3]}$$

First, the rotation matrix R and the translation vector t are initialized. In addition, an initial value (as an example, 0) of the evaluation function $C_{PRE}$ representing an average positional shift amount of the coordinate position is set.

17

$$R = \begin{bmatrix} 1 & 0 & 0 \\ 0 & 1 & 0 \\ 0 & 0 & 1 \end{bmatrix}$$ [Equation 4]

$$t = \begin{bmatrix} 1 & 1 & 1 \end{bmatrix}^T$$

$$C_{pre} = 0$$

Next, an evaluation function C representing the average positional shift amount of the coordinate position is calculated as follows. It should be noted that when this example is applied to the following equation, L=3.

$$C = \frac{1}{L} \sum_{i=1}^{L} \|y_i - x_i\|$$ [Equation 5]

Next, the centroid of each of two data matrices is calculated as follows.

$$\bar{X} = \frac{1}{L} \sum_{i=1}^{L} x_i$$ [Equation 6]

$$\bar{Y} = \frac{1}{L} \sum_{i=1}^{L} y_i$$

Next, the two data matrices are converted into a matrix W of a coordinate system centered at the centroid, and the matrix W is subjected to a singular value decomposition as shown in the following equation.

$$W = \sum_{i=1}^{L} (x_i - \bar{X})(y_i - \bar{Y})^T = U \sum V^T$$ [Equation 7]

By using a matrix U and a matrix V obtained by the singular value decomposition, a rotation matrix $R_C$ can be calculated, as shown in the following equation.

$$R_c = V \operatorname{diag}(1, 1, \det(VU^T))U^T$$ [Equation 8]

Further, using the calculated rotation matrix $R_C$, a translation vector $t_C$ can be calculated, as shown in the following equation.

$$t_c = \bar{Y} - R_c \bar{X}$$ [Equation 9]

Using the calculated rotation matrix $R_C$ and translation vector $t_C$, the data matrix, rotation matrix, and translation vector are updated, as shown in the following equation.

$$x_i \leftarrow R_c x_i + t_c$$ [Equation 10]

$$R \leftarrow R_c R$$

$$t \leftarrow R_c t + t_c$$

Next, a change amount $|C_{pre}-C|$ of the value of the evaluation function is calculated, and a calculation result is compared with a threshold value $d_{Cth}$. For example, when $|C_{pre}-C| \geq d_{Cth}$, the value of $C_{pre}$ is updated to the value of C, and the calculations from Equation 5 to Equation 10 are performed. The calculations from Equation 5 to Equation 10 are repeated until $|C_{pre}-C| < d_{Cth}$. When $|C_{pre}-C| < d_{Cth}$, the pairwise alignment ends. If $|C_{pre}-C|/_h < d_{Cth}$ is not satisfied after repeating the calculations a predetermined number of times or more, the pairwise alignment may be determined to be defective.

The rotation matrix R and the translation vector t calculated as described above are used to perform the coordinate transformation on a data matrix y, as shown in the following equation, thereby making it possible to align the data matrix y with a data matrix x.

$$\hat{y}_i = R^{-1}(y_i - t)$$ [Equation 11]

By applying the pairwise alignment described above, the rotation matrix identification part 244 identifies the first rotation matrix as a unit matrix and can identify a second rotation matrix R, as shown in the right side of Equation 11. The measurement part 243 coordinate-transforms the second coordinate shown in FIG. 5B into a third coordinate shown in FIG. 5C by applying such a rotation matrix R, for example. By doing this, the measurement part 243 can convert the first direction Tx2 and the second direction Ty2 of the second coordinate system into a first direction Tx3 and a second direction Ty3 of the third coordinate system such that the first direction Tx2 and the second direction Ty2 of the second coordinate system approximately coincide with the first direction Tx1 and the second direction Ty1 of FIG. 5A.

As described above, the rotation matrix identification part 244 identifies the rotation matrix R by performing the pairwise alignment using the first centroid matrix x and the second centroid matrix y as two corresponding data matrices.

Next, the translation vector identification part 245 identifies a translation vector in S66 of FIG. 4. In this case, operations from S74 to S76 of FIG. 7 correspond to the detailed operation in S66 of FIG. 4. It should be noted that, in S64, the control part 240 identifies the coordinate position of the element to be measured 31 for each position to which the calibration jig 30 was moved.

For example, the control part 240 generates a matrix $X1=[x_{11}, \ldots, x_{1N}]$ in which a matrix indicating the first coordinate position is defined as the element $x_{1i}$ and the number N of the first elements to be measured 31a is the number of elements, on the basis of the capturing result obtained when the calibration jig 30 is disposed at the second reference position in S59. Further, the control part 240 generates a matrix $X4=[x_{41}, \ldots, x_{4N}]$ in which a matrix indicating the first coordinate position after the rotation of the calibration jig 30 about the axis oriented in the third direction is defined as the element $x_{4i}$ in S60, and the matrix $X5=[x_{51}, \ldots, x_{5N}]$ in which a matrix indicating the first coordinate position after the rotation of the calibration jig 30 about the axis oriented in the fourth direction is defined as the element $x_{5i}$ in S62.

Similarly, the control part 240 generates a matrix $Y1=[y_{11}, \ldots, y_{1M}]$ in which a matrix indicating the second coordinate position is defined as the element $y_{1i}$ and the number M of the second elements to be measured 31b is the number of elements, on the basis of the capturing result obtained when the calibration jig 30 is disposed at the second reference position in S59. Further, the control part 240 generates a matrix Y4=[$y_{41}$, . . . , $y_{4M}$] in which a matrix indicating the second coordinate position after the rotation of the calibration jig 30 about the axis oriented in the third direction is defined as the element $y_4$i in S60, and the matrix $y_5$=[$y_{51}$ . . . , $y_{5M}$] in which a matrix indicating the second coordinate position after the rotation of the calibration jig 30 about the axis oriented in the fourth direction is defined as the element $y_{5i}$ in S62.

Then, the translation vector identification part 245 generates a first calibration matrix, a second calibration matrix, and a third calibration matrix that are calibrated by rotating the generated matrices X1, X4, and X5 with the first rotation matrix (S74). Here, the i-th element of the first calibration matrix is denoted by $P_i$, the i-th element of the second calibration matrix is denoted by $P_{\theta i}$, and the i-th element of the third calibration matrix is denoted by $P_{\varphi i}$. FIG. 6A shows an example in which $P_i$, $P_{\theta i}$, and $P_{\varphi i}$ are plotted.

Further, the translation vector identification part 245 generates a fourth calibration matrix, a fifth calibration matrix, and a sixth calibration matrix that are calibrated by rotating the generated matrices Y1, Y4, and Y5 with the second rotation matrix. Here, the j-th element of the fourth calibration matrix is denoted by $p_j$, the j-th element of the fifth calibration matrix is denoted by $p_{\theta j}$, and the j-th element of the sixth calibration matrix is denoted by $p_{\varphi j}$. FIG. 6B shows an example in which such $p_j$, $p_{\theta j}$, and $p_{\varphi j}$ are plotted.

Next, the translation vector identification part 245 sets, as a first distance, a distance from a coordinate position obtained by adding the first translation vector T1 to the first calibration matrix to a coordinate position obtained by adding the second translation vector T2 to the fourth calibration matrix. The translation vector identification part 245 sets, as a second distance, a distance from a coordinate position obtained by adding the first translation vector T1 to the second calibration matrix to a coordinate position obtained by adding the second translation vector T2 to the fifth calibration matrix. Similarly, the translation vector identification part 245 sets, as a third distance, a distance from a coordinate position obtained by adding the first translation vector T1 to the third calibration matrix to a coordinate position obtained by adding the second translation vector T2 to the sixth calibration matrix.

Then, the translation vector identification part 245 identifies the first translation vector T1 and the second translation vector T2 so that the first distance, the second distance, and the third distance coincide with each other. In this embodiment, an example is shown in which the second translation vector T is calculated by setting the first translation vector T1 as a zero vector and setting the second translation vector T2 as T.

For example, a translation vector T for coordinate-transforming the second coordinate system based on the capturing result of the second imaging part 132*b* shown in FIG. 6B is used to represent the coordinate position after the coordinate transformation, as shown in the following equation. FIG. 6C shows the third coordinate system after the coordinate transformation from the second coordinate.

$$P'_j = p_j + T \qquad \text{[Equation 12]}$$

$$P'_{\theta j} = p_{\theta j} + T$$

$$P'_{\varphi j} = p_{\varphi j} + T$$

Next, the distance from the coordinate position of the i-th first element to be measured 31*a* of the first coordinate system to the coordinate position of the j-th second element to be measured 31*b* of the third coordinate system is represented by the following equation. Here, the first distance is $d_{ij}$, the second distance is $d_{\theta ij}$, and the third distance is $d_{\varphi ij}$.

$$d_{ij} = |P_i - P'_j| \qquad \text{[Equation 13]}$$

$$d_{\theta ij} = |P_{\theta i} - P'_{\theta j}|$$

$$d_{\varphi ij} = |P_{\varphi i} - P'_{\varphi j}|$$

A function for evaluating the magnitude of the error of the distance from the coordinate position of the first element to be measured 31*a* of the first coordinate system to the coordinate position of the second element to be measured 31*b* of the third coordinate system before and after rotating the calibration jig 30 is defined as a function S of the following equation. Here, N1 is the number of the first elements to be measured 31*a*, and N2 is the number of the second elements to be measured 31*b*.

$$S = \sum_i^{N1} \sum_j^{N2} [(d_{ij} - d_{\theta ij})^2 + (d_{ij} - d_{\varphi ij})^2 + (d_{\varphi ij} - d_{\theta ij})^2] \qquad \text{[Equation 14]}$$

The translation vector identification part 245 calculates T with which the value of the function S shown in Equation 14 becomes minimum (S75). Instead of Equation 14, the translation vector identification part 245 may calculate T with which the value of the following equation will be minimum.

$$S = \sum_i^{N1} \sum_j^{N2} [(d_{ij}^2 - d_{\theta ij}^2)^2 + (d_{ij}^2 - d_{\varphi ij}^2)^2 + (d_{\varphi ij}^2 - d_{\theta ij2})^2] \qquad \text{[Equation 15]}$$

Since the operation of calculating T by minimizing S in Equation 14 or S in Equation 15 can be executed by a known method, detailed description of the operation is omitted here. Then, the translation vector identification part 245 identifies T with which the value of S in Equation 14 or S in Equation 15 is minimized as the translation vector T (S76).

Thus, the rotation matrix identification part 244 and the translation vector identification part 245 can identify the rotation matrix R and the translation vector T, which are the parameters used for the calibration of the measurement apparatus 10. The measurement apparatus 10 can measure the three-dimensional geometry of the measurement target W with the accuracy of the device performance by calibrating itself using the identified rotation matrix R and translation vector T.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present invention. Further, effects of the new embodiment brought by the combinations also have the effect of the original exemplary embodiment together.

What is claimed is:

1. A calibration method in which a computer calibrates, using a calibration jig, a measurement apparatus that measures a three-dimensional geometry of a measurement target and includes a plurality of imaging parts that capture the measurement target, the calibration method comprising:

a first imaging step of imaging a first element to be measured among a plurality of elements to be measured having a predetermined shape with a first imaging part and imaging a second element to be measured, which is different from the first element to be measured, with a second imaging part, which is different from the first imaging part, the plurality of elements to be measured being included in the calibration jig;

a second imaging step of imaging the first element to be measured with the first imaging part and imaging the second element to be measured with the second imaging part, after causing the calibration jig to be moved in a predetermined first direction after the first imaging step;

a third imaging step of imaging the first element to be measured with the first imaging part and imaging the second element to be measured with the second imaging part, after causing the calibration jig to be moved in a predetermined second direction different from the first direction after the second imaging step;

a fourth imaging step of imaging the first element to be measured with the first imaging part and imaging the second element to be measured with the second imaging part;

a fifth imaging step of imaging the first element to be measured with the first imaging part and imaging the second element to be measured with the second imaging part, after rotating the calibration jig about an axis oriented in a predetermined third direction after the fourth imaging step;

a sixth imaging step of imaging the first element to be measured with the first imaging part and imaging the second element to be measured with the second imaging part, after rotating the calibration jig about an axis oriented in a predetermined fourth direction different from the third direction after the fifth imaging step;

identifying a first coordinate position indicating a position of the first element to be measured in a first coordinate system based on a field of view of the first imaging part in a plurality of captured images captured by the first imaging part, and a second coordinate position indicating a position of the second element to be measured in a second coordinate system based on a field of view of the second imaging part in a plurality of captured images captured by the second imaging part;

identifying a first rotation matrix for rotating the first coordinate system to perform a coordinate transformation and a second rotation matrix for rotating the second coordinate system to perform a coordinate transformation such that a direction in which the first coordinate position is moved and a direction in which the second coordinate position is moved coincide with each other before and after moving of the calibration jig in the first direction and the second direction; and identifying a first translation vector for translating the first coordinate system and a second translation vector for translating the second coordinate system such that a distance between the first element to be measured and the second element to be measured is the same before and after rotating the calibration jig.

2. The calibration method according to claim 1, further comprising:

coordinate-transforming the first coordinate system into a calibration coordinate system by rotating the first coordinate position with the first rotation matrix and by translating the position after the rotation by the first translation vector; and coordinate-transforming the second coordinate system into the calibration coordinate system by rotating the second coordinate position with the second rotation matrix and by translating the position after the rotation by the second translation vector.

3. The calibration method according to claim 1, wherein the first direction and the second direction are orthogonal to each other.

4. The calibration method according to claim 1, wherein the third direction and the fourth direction are orthogonal to each other.

5. The calibration method according to claim 1, wherein the identifying the first rotation matrix and the second rotation matrix includes:

generating a first centroid matrix X based on a matrix indicating the first coordinate position, a matrix indicating the first coordinate position after the calibration jig is moved in the first direction, and a matrix indicating the first coordinate position after the calibration jig is moved in the second direction;

generating a second centroid matrix Y based on a matrix indicating the second coordinate position, a matrix indicating the second coordinate position after the calibration jig is moved in the first direction, and a matrix indicating the second coordinate position after the calibration jig is moved in the second direction; and identifying the first rotation matrix and the second rotation matrix by performing a pairwise alignment on the coordinate position indicated by each element of the first centroid matrix X and the coordinate position indicated by each element of the second centroid matrix Y.

6. The calibration method according to claim 5, wherein the generating the first centroid matrix includes:

generating (i) a matrix $X1=[x_{11}, \ldots, x_{1N}]$ in which a matrix $x_{1i}$ indicating the first coordinate position of the i-th first element to be measured is defined as an element and the number N of the first elements to be measured is the number of elements, (ii) a matrix $X_2=[x_{21}, \ldots, x_{2N}]$ in which a matrix indicating the first coordinate position after the calibration jig is moved in the first direction is defined as an element $x_{2i}$, and (iii) a matrix $X3=[x_{31}, \ldots, x_{3N}]$ in which a matrix indicating the first coordinate position after moving the calibration jig in the second direction is defined as an element $x_{3i}$;

calculating centroids of the generated matrix X1, matrix X2, and matrix X3; and generating, as the first centroid matrix $X=[x_1, x_2, x_3]$, a matrix having the calculated centroids $x_1$, $x_2$, and $x_3$ as elements, and the generating the second centroid matrix includes:

generating (i) a matrix $Y1=[y_{11}, \ldots, y_{1M}]$ in which a matrix $y_{1i}$ indicating the second coordinate position is defined as an element $y_{1i}$ and the number M of the second elements to be measured is the number of elements, (ii) a matrix $Y2=[y_{21}, \ldots, y_{2i}]$ in which a matrix indicating the second coordinate position after the calibration jig is moved in the first direction is defined as an element $y_{2i}$, and (iii) a matrix $Y3=[y_{31}, \ldots, y_{3M}]$ in which a matrix indicating the second coordinate position after the calibration jig is moved in the second direction is defined as an element $y_{3i}$;

calculating centroids of the generated matrix Y1, matrix Y2, and matrix Y3; and generating, as the second centroid matrix Y=[y1, y2, y3], a matrix having the calculated centroids $y_1$, $y_2$, and $y_3$ as elements.

7. The calibration method according to claim 1, wherein the identifying the first translation vector and the second translation vector includes:

generating (i) a matrix $X1=[x_{11}, \ldots, x_{1N}]$ in which a matrix indicating the first coordinate position is defined as an element $x_{11}$ and the number N of the first elements to be measured is the number of elements, (ii) a matrix $X4=[x_{41}, \ldots, x_{4N}]$ in which a matrix indicating the first coordinate position after the calibration jig is rotated about the axis oriented in the third direction is defined as an element $x_{4i}$, and (iii) a matrix $X5=[x_{51}, \ldots, x_{5N}]$ in which a matrix indicating the first coordinate position after the calibration jig is rotated about the axis oriented in the fourth direction is defined as an element $x_5$, and generating a first calibration matrix, a second calibration matrix, and a third calibration matrix that are calibrated by rotating the generated matrices X1, X4, and X5 with the first rotation matrix;

generating a matrix $Y1=[y_{11}, \ldots, y_{1M}]$ in which a matrix indicating the second coordinate position is an element $y_{1i}$ and the number M of the second elements to be measured is the number of elements, a matrix $Y4=[y_{41}, \ldots, y_{4M}]$ in which a matrix indicating the second coordinate position after rotating the calibration jig about the axis oriented in the third direction is defined as an element $y_{4i}$, and a matrix $y_5=[y_{51}, \ldots, y_{5M}]$ in which a matrix indicating the second coordinate position after the calibration jig is rotated about the axis oriented in the fourth direction is an element $y_{3i}$, and generating a fourth calibration matrix, a fifth calibration matrix, and a sixth calibration matrix that are calibrated by rotating the generated matrices Y1, Y4, and Y5 with the first rotation matrix; and identifying the first translation vector and the second translation vector so that (i) a first distance from a coordinate position obtained by adding the first translation vector to the first calibration matrix to a coordinate position obtained by adding the second translation vector to the fourth calibration matrix, (ii) a second distance from a coordinate position obtained by adding the first translation vector to the second calibration matrix to a coordinate position obtained by adding the second translation vector to the fifth calibration matrix, and (iii) a third distance from a coordinate position obtained by adding the first translation vector to the sixth calibration matrix to a coordinate position obtained by adding the second translation vector to the sixth calibration matrix coincide with each other.

8. The calibration method according to claim 7, wherein the identifying the first translation vector and the second translation vector includes:

letting $P_i$ be an i-th element of the first calibration matrix, $P_{\theta i}$ be an i-th element of the second calibration matrix, $P_{\varphi i}$ be an i-th element of the third calibration matrix, $p_j$ be a j-th element of the fourth calibration matrix, $p_{\theta j}$ be a j-th element of the fifth calibration matrix, and $p_{\varphi j}$ be a j-th element of the sixth calibration matrix;

letting the first translation vector be a zero vector and the second translation vector be T, and thereby expressing the first distance, the second distance, and the third distance by the following equations, $$
\begin{cases}
d_{ij} = \left| P_i - P'_j \right| \\
d_{\theta ij} = \left| P_{\theta i} - P'_{\theta j} \right| \\
d_{\varphi ij} = \left| P_{\varphi i} - P'_{\varphi j} \right|
\end{cases}
\tag{1}
$$

$$
\begin{cases}
P'_j = p_j + T \\
P'_{\theta j} = p_{\theta j} + T \\
P'_{\varphi j} = p_{\varphi j} + T
\end{cases}
\tag{2}
$$

where the first distance is $d_{ij}$, the second distance is $d_{\theta ij}$, and the third distance is $d_{\varphi ij}$; and calculating the second translation vector T with which a value of an evaluation function S shown in the following equation becomes minimum, $$
S = \sum_{i}^{N1} \sum_{j}^{N2} \left[ (d_{ij} - d_{\theta ij})^2 + (d_{ij} - d_{\varphi ij})^2 + (d_{\varphi ij} - d_{\theta ij})^2 \right]
\tag{3}
$$

assuming that N1 is the number of the first elements to be measured and N2 is the number of the second elements to be measured.

9. The calibration method according to claim 7, wherein the identifying the first translation vector and the second translation vector includes:

letting $P_i$ be an i-th element of the first calibration matrix, $P_{\theta i}$ be an i-th element of the second calibration matrix, $P_{\varphi i}$ be an i-th element of the third calibration matrix, $p_j$ be a j-th element of the fourth calibration matrix, $p_{\theta j}$ be a j-th element of the fifth calibration matrix, and $p_{\varphi j}$ be a j-th element of the sixth calibration matrix;

letting the first translation vector be a zero vector and the second translation vector be T, and thereby expressing the first distance, the second distance, and the third distance by the following equations, $$
\begin{cases}
d_{ij} = \left| P_i - P'_j \right| \\
d_{\theta ij} = \left| P_{\theta i} - P'_{\theta j} \right| \\
d_{\varphi ij} = \left| P_{\varphi i} - P'_{\varphi j} \right|
\end{cases}
\tag{1}
$$

$$
\begin{cases}
P'_j = p_j + T \\
P'_{\theta j} = p_{\theta j} + T \\
P'_{\varphi j} = p_{\varphi j} + T
\end{cases}
\tag{2}
$$

where the first distance is $d_{ij}$, the second distance is $d_{\theta ij}$, and the third distance is $d_{\varphi ij}$; and calculating the second translation vector T with which a value of an evaluation function S shown in the following equation becomes minimum, $$
S = \sum_{i}^{N1} \sum_{j}^{N2} \left[ (d_{ij}^2 - d_{\theta ij}^2)^2 + (d_{ij}^2 - d_{\varphi ij}^2)^2 + (d_{\varphi ij}^2 - d_{\theta ij}^2)^2 \right]
\tag{4}
$$

assuming that N1 is the number of the first elements to be measured and N2 is the number of the second elements to be measured.

10. The calibration method according to claim 1, further comprising:

capturing a reference jig that is smaller in size than the calibration jig and has a plurality of reference measuring elements for which at least one of dimensions or positional relationships is known with the first imaging part, and calibrating the first coordinate system indicating a coordinate position in a field of view of the first imaging part on the basis of a capturing result of the first imaging part; and capturing the reference jig with the second imaging part, and calibrating the second coordinate system indicating a coordinate position in a field of view of the second imaging part on the basis of a capturing result of the second imaging part, before calibrating the measurement apparatus using the calibration jig.

11. A calibration method in which a computer calibrates, using a calibration jig, a measurement apparatus that measures a three-dimensional geometry of a measurement target and includes a plurality of imaging parts that capture the measurement target, the calibration method comprising:

a first imaging step of imaging a first element to be measured among a plurality of elements to be measured having a predetermined shape with a first imaging part and imaging a second element to be measured, which is different from the first element to be measured, with a second imaging part, which is different from the first imaging part, the plurality of elements to be measured being included in the calibration jig;

a second imaging step of imaging the first element to be measured with the first imaging part and imaging the second element to be measured with the second imaging part, after causing the calibration jig to be moved in a predetermined first direction after the first imaging step;

a third imaging step of imaging the first element to be measured with the first imaging part and imaging the second element to be measured with the second imaging part, after causing the calibration jig to be moved in a predetermined second direction different from the first direction after the second imaging step;

a fourth imaging step of imaging the first element to be measured with the first imaging part and imaging the second element to be measured with the second imaging part;

a fifth imaging step of imaging the first element to be measured with the first imaging part and imaging the second element to be measured with the second imaging part, after rotating the calibration jig about an axis oriented in a predetermined third direction after the fourth imaging step;

a sixth imaging step of imaging the first element to be measured with the first imaging part and imaging the second element to be measured with the second imaging part, after rotating the calibration jig about an axis oriented in a predetermined fourth direction different from the third direction after the fifth imaging step; and calibrating the measurement apparatus on the basis of the capturing results of the first imaging part and the second imaging part.

12. A measurement system comprising:

the measurement apparatus that measures a three-dimensional geometry of the measurement target; and the calibration jig that has an element to be measured having a predetermined shape and is a jig for calibrating the measurement apparatus, wherein the calibration jig includes the first element to be measured and the second element to be measured having a predetermined shape, wherein the measurement apparatus includes:

a moving part that moves the measurement target;

a light source that radiates light onto the measurement target;

a plurality of imaging parts that respectively capture a plurality of different regions of the measurement target; and a control part that controls the moving part and the imaging parts to measure the three-dimensional geometry of the measurement target on the basis of capturing results of the plurality of imaging parts, and the control part causes the plurality of imaging parts to capture the first element to be measured and the second element to be measured before and after the moving of the calibration jig, while moving the calibration jig, and calibrates the measurement apparatus by executing the calibration method according to claim 1.

* * * * *